June 10, 1924.　　　　　A. B. BECHTEL　　　　　1,496,766
SUPPLEMENTAL WINDSHIELD
Filed Sept. 16, 1920　　　3 Sheets-Sheet 1
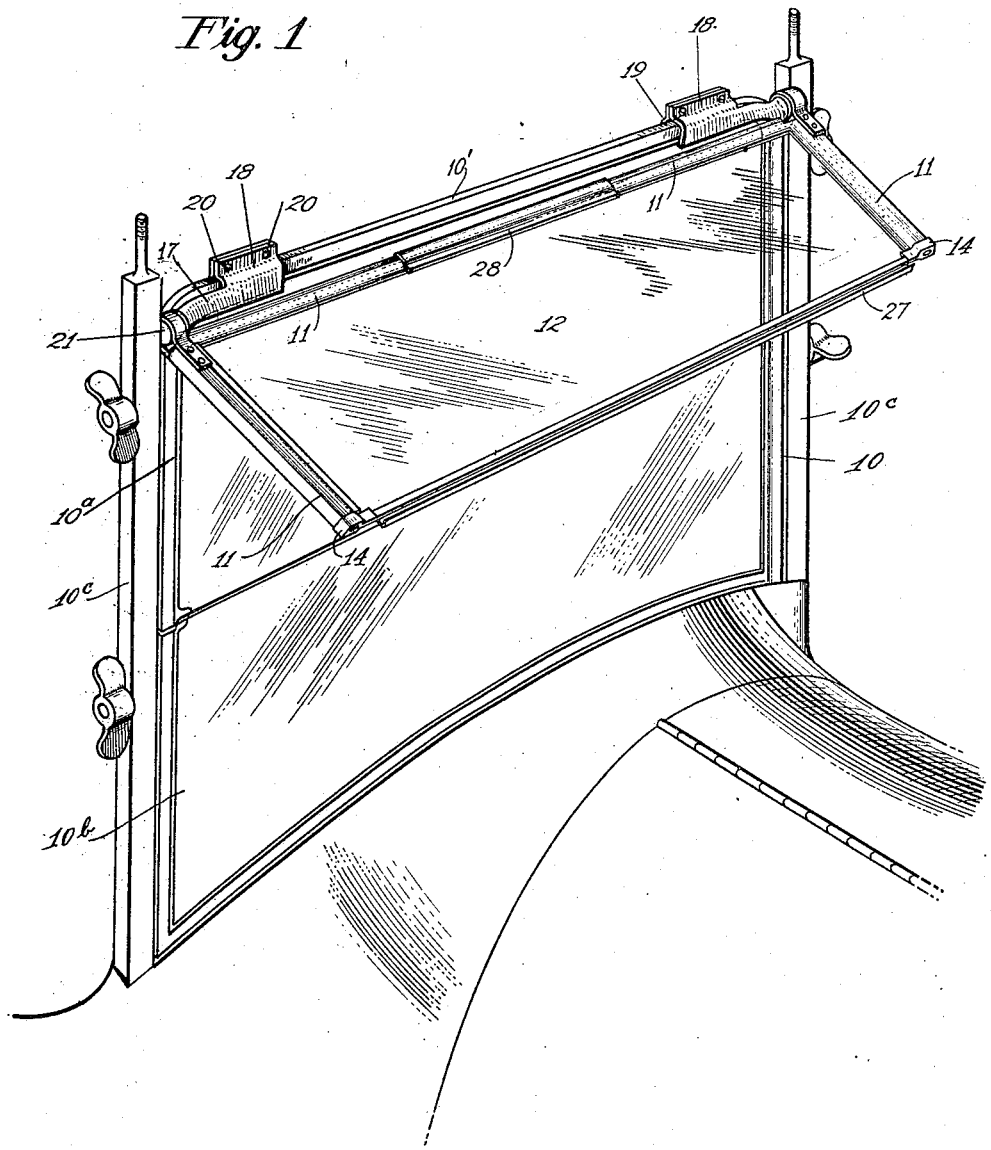
INVENTOR
Alfred B. Bechtel
BY Jas. H. Griffin
ATTORNEYS

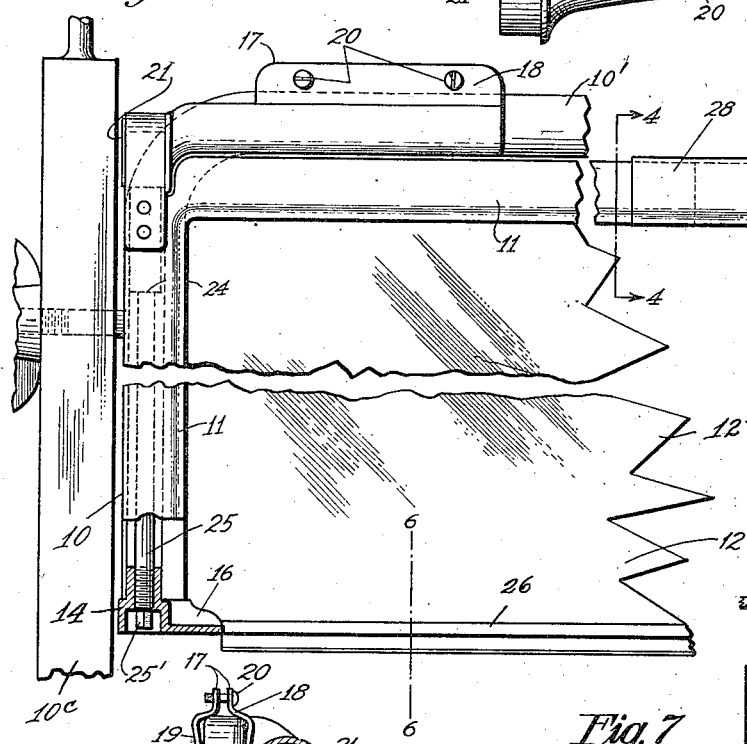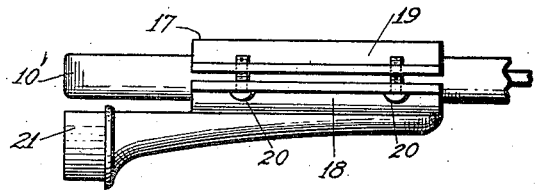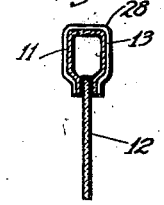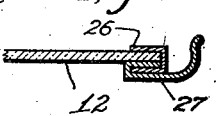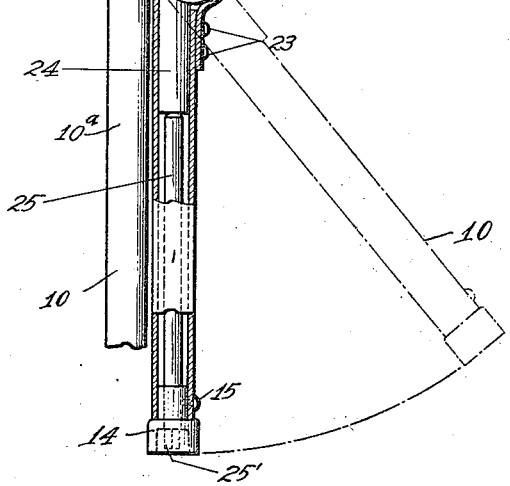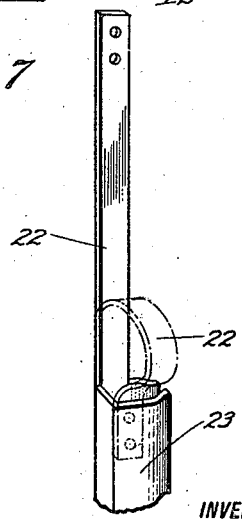
INVENTOR
Alfred B. Bechtel
BY
Jas. H. Griffin
ATTORNEYS June 10, 1924.

A. B. BECHTEL

SUPPLEMENTAL WINDSHIELD

Filed Sept. 16, 1920

INVENTOR
Alfred B Bechtel
BY Jas. H. Griffin
ATTORNEYS

Patented June 10, 1924.

1,496,766

UNITED STATES PATENT OFFICE.

ALFRED B. BECHTEL, OF PHILADELPHIA, PENNSYLVANIA.

SUPPLEMENTAL WINDSHIELD.

Application filed September 16, 1920. Serial No. 410,623.

*To all whom it may concern:*

Be it known that I, ALFRED B. BECHTEL, a citizen of the United States, residing in Philadelphia, in the county of Philadelphia and State of Pennsylvania, have invented a certain new and useful Supplemental Windshield, of which the following is a specification.

This invention relates to windshields of automobiles, pleasure cars and trucks and is directed, more particularly, to a supplemental windshield, which may be used in conjunction with the windshield ordinarily employed for the purpose of precluding rain, sleet or snow from beating down upon the main windshield and obscuring the driver's view.

Heretofore, in some of the more expensive pleasure cars, supplemental windshields have been employed for the above purposes as stated, but such supplemental windshields have been built as a part of the main windshield and are assembled therewith during the manufacture of same.

The object of the present invention is to provide a supplemental windshield so constructed that it is adapted to be associated with a windshield of any automobile in a simple and expeditious manner, and to provide such an attachment as may be economically manufactured and marketed at a price within reach of the average car owner. Features of the invention other than those specified will be apparent from the following description when read in conjunction with the accompanying drawings.

In the drawings, I have illustrated one practical embodiment of the invention, but the construction therein shown is to be understood as illustrative, only, and not as defining the limits of the invention.

Figure 1 is a perspective view of the forward portion of a car body showing the usual form of windshield thereon, and the supplemental windshield of the present invention associated therewith.

Figure 2 is a front elevation of one end of the supplemental windshield, showing the manner in which it is secured to the main windshield.

Figure 3 is an end elevation of the structure shown in Figure 2, as viewed from the left hand side of Figure 2.

Figure 4 is a section on the line 4—4 of Figure 2.

Figure 5 is a plan view of one end of the main windshield, showing the manner in which the supplemental windshield is mounted thereon.

Figure 6 is a section on the line 6—6 of Figure 2.

Figure 7 is a detailed perspective of a frame structure preferably employed.

Figure 8:
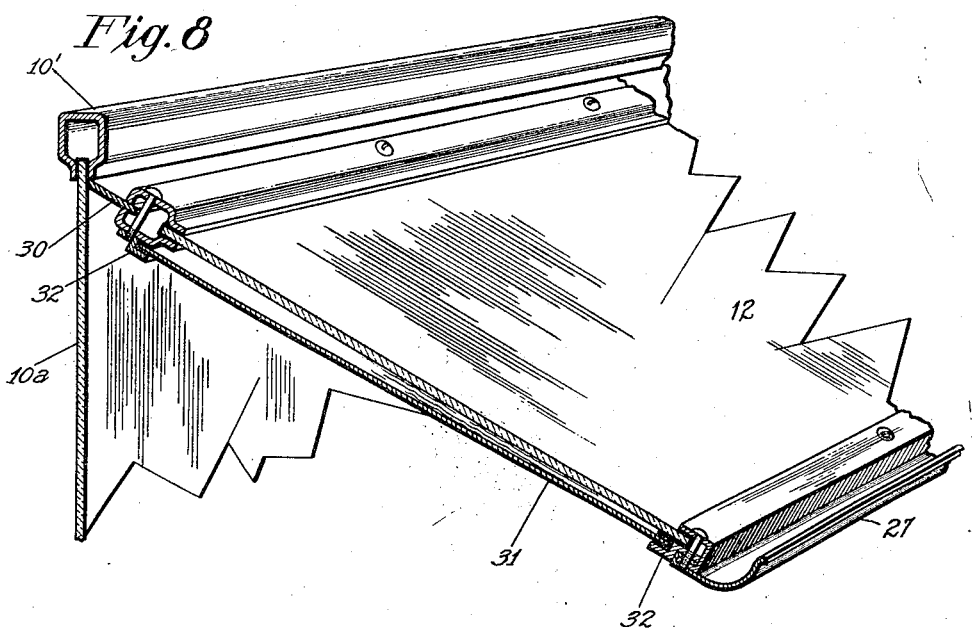
Figure 8 is a fragmental perspective section showing further improvements which may be associated with the present invention.

Referring to the drawings, 10 designates a windshield of the conventional form, which is mounted on the car in any suitable, well known way. This windshield, which will hereinafter be termed the main windshield, forms no part of the present invention and need not further be described. Suffice it to say that it embodies an upper section 10$^a$ and a lower section 10$^b$ both of which are mounted for pivotal adjustment on upright posts 10$^c$, as shown.

The supplemental windshield, to which the invention is particularly directed, embodies a rectangular three-sided frame 11 of channeled or box-like cross section, as shown in Figure 7, whereby it is adapted to support the plate of glass 12. The glass is preferably set into the frame 11 with an edging 13 of rubber or other suitable material, as shown in Figure 4, so as to cushion the glass to some extent but, primarily, to preclude rattling and insure a tight fit. The glass 12 is slipped into the frame from the lower edge thereof and is held in place by small castings 14, which fit into the lower end of each of the said bars of the frame, as shown in Figures 2 and 3, and is preferably secured therein by means of screws 15. The castings 14 are provided with lips 16, which underlie the lower edge of the glass, as shown in Figure 2, and maintain the same in position within the frame. The frame 11 is adapted to be mounted on the upper section 10$^a$ of the main windshield 10 by means of clamping brackets 17, one of which is associated with each end of the frame and is adapted to clamp over the horizontal cross bar 10' at the top of the upper section of the main windshield, as clearly shown in the drawings. Each of these clamping brackets embodies a relatively fixed jaw 18 and a relatively movable jaw 19, which jaws are adapted to be clamped together by screws 20, as shown in Figure 3, to mount the bracket firmly on the main windshield. The fixed jaw 18 of each bracket carries a circular trunnion 21, and when the parts are mounted in fixed position, the trunnion 21 of the two brackets will be positioned in alinement with one another at the opposite sides of the main windshield and so placed that they are adapted to support the supplemental windshield in the manner next to be described.

Each vertical side stile of the said frame 11 of the supplemental windshield is formed at its upper end, as shown in Figure 7, to provide a strap 22, which is adapted to be bent over, as shown in dotted lines, and riveted, welded or otherwise secured to the side stile 23 of the windshield from which it projects, for the purpose of forming a loop adapted to extend around the corresponding trunnion 21 and form a pivotal connection between said side stile and the trunnion. Through this simple, inexpensive and efficient manner of manipulating the material from which the frame 11 is formed, such frame may be economically and efficiently mounted for adjustment on a horizontal axis on the trunnions 21.

It is desired, if not essential, that means be provided for locking the supplemental windshield at any degree of angular adjustment desired and this may be readily provided for by positioning interiorly of each of the side stiles of the frame 11, a slide block 24, the upper end of which is curved to correspond with the circumference of the trunnions 21. Each slide block 24 is adapted to be forced against the trunnions 21, by means of an adjusting rod 25, which extends downward longitudinally within the side stile and threads through the casing 14 and is squared or polygonal at its lower end 25' to permit of its manipulation by a key. When it is desired to lock the supplemental windshield in any angular position, it is only necessary to apply the key to the square end 25' and rotate the rod 25 so as to force the slide block 24 into tight frictional engagement with the trunnions 21. When this has been accomplished, both ends of the supplemental shield will be frictionally locked in position and will remain in such position until the key is employed to release the slide blocks 24 and discontinue the friction relation between the parts, whereupon the supplemental shield may be adjusted to a different position and locked into place as before.

The foregoing structure for locking the supplemental windshield in any degree of angular adjustment is particularly novel and efficient. It carries out its functions very satisfactorily and is of such simple character that it may be economically produced and easily operated. Moreover, being operable from the lower edge of the supplemental shield, it is within easy access and may be conveniently operated.

I further consider it a distinct advantage to mount the supplemental shield in a detachable manner on the upper edge of the main windshield, as described, as this gives a very convenient and rigid method of mounting, and the attached brackets are so positioned that they do not unduly encumber the main windshield.

While the invention, thus far described, may be used as complete, I preferably associate with the lower edge of the glass 12, a binding 26, by means of which I attach to said edge of the glass a small gutter 27, so that rain falling on the supplemental shield 12, while in the position shown in Figure 1 or in any other similar position, will not drip from the lower edge of the shield and be carried by the wind back against the main windshield. The gutter 27 will serve to carry the water to the lateral edges of the supplemental shield from which it may fall, without seriously hampering proper vision of the driver.

Moreover, while the present invention may be made in different sizes to fit the main windshield of different widths, I contemplate making a sliding joint in the top cross bar of the frame 11, so as to render the frame adjustable as to width, whereby the frame may be adjusted to fit any windshield. This sliding joint may be formed by parting the upper horizontal cross bar of the supplemental shield at its center, so that the width of the supplemental shield may be varied and uniting the adjacent ends of said bar by means of a sliding union 28 which fits over the upper edge of the supplemental shield and maintains the opposite halves of the cross bar in alined relation, while permitting of an increase or decrease in the length of the cross bar. The union 28 may be normally locked in place by means of screws or otherwise. The glass 12 may be cut to the size desired and by this arrangement the supplemental shield of this invention may be adapted to the main windshields of various sizes, thereby obviating the necessity of carrying a great number of supplemental windshield frame sizes in stock.

Figure 9:
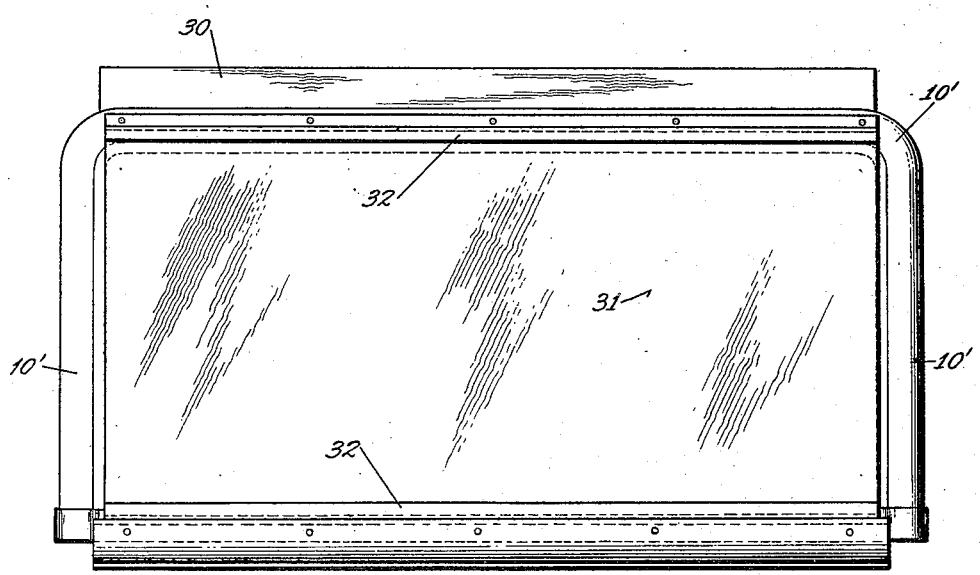
Figure 9 is an underneath plan view of a supplemental wind shield embodying the structure shown in Figure 8.

If desired, I can further associate with the supplemental shield of this invention, the features of novelty shown in Figures 8 and 9. That is to say, the upper edge of the upper horizontal bar of the supplemental shield may be longitudinally slotted to receive one edge of a strip of rubber 30, which may be clamped in place in the slot and is of such width that when the supplemental shield is in position on the main windshield, the free edge of the rubber strip will rest against the glass of the main windshield for the purpose of precluding water from creeping in between the upper edge of the supplemental windshield and the main windshield.

Moreover, the supplemental windshield may have associated therewith a sun shade 31 of any suitable material and this sun shade may be clamped or otherwise secured to the under surface of the supplemental shield so as to protect the chauffeur's eyes from the glare of the sun. This sun shade may be conveniently supported in place by providing the slide 32 on the under side of the supplemental shield, shown in Figures 8 and 9, and by clamping the opposite edges of the shade within said slides so as to support the shade in place.

From the foregoing description, it will appear that the present invention embodies many features of novelty, the aggregate of which produce a structure of considerable merit and efficiency. I am aware, however, that certain of the features described may be employed in a supplemental windshield construction without necessarily employing all. Accordingly, the invention is to be understood as not restricted to a supplemental windshield embodying all of these features, and, moreover, may be changed in details of construction to embody equivalents, without departing from the spirit and scope of the invention, which is to be understood as broadly novel as is commensurate with the appended claims.

What I claim is:

An assembly of the character described embodying a pair of clamps adapted to be clamped over an upper edge of a main windshield and provided with laterally extending trunnions, a supplemental windshield provided with a frame and embodying bearings adapted to embrace the trunnions, plungers operable within the frame and projecting into the interior of the bearings and engaging with the trunnions, and rods housed within and having threaded engagement with the frame and operable from the forward free edge of the frame for forcing the plungers into tight engagement with the trunnions to preclude pivotal movement of the supplemental windshield on the trunnions and maintain said supplemental windshield at the desired angle of inclination.

In testimony whereof, I have signed my name to this specification.

ALFRED B. BECHTEL.